W. F. LORING.
DEVICE FOR HARVESTING CRANBERRIES.
APPLICATION FILED FEB. 12, 1919.
1,348,132. Patented July 27, 1920.
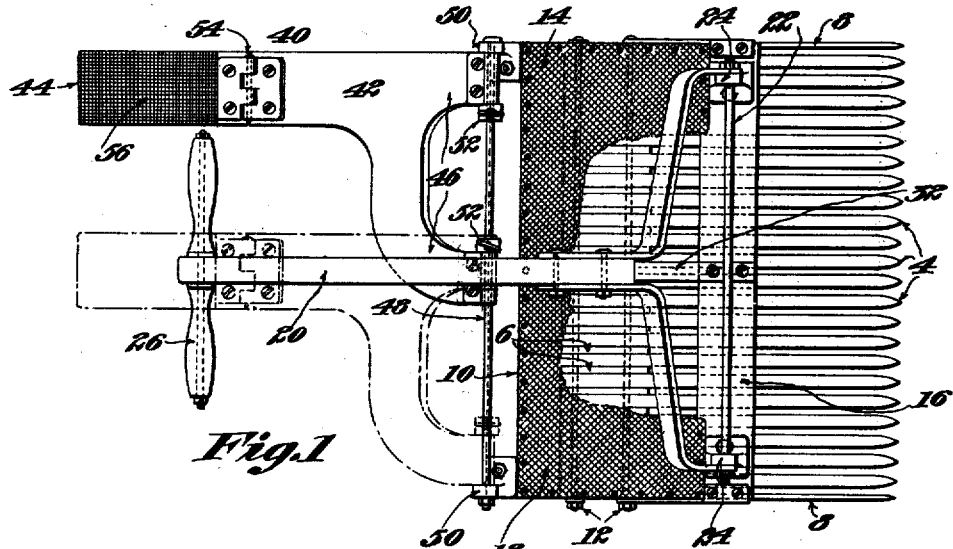
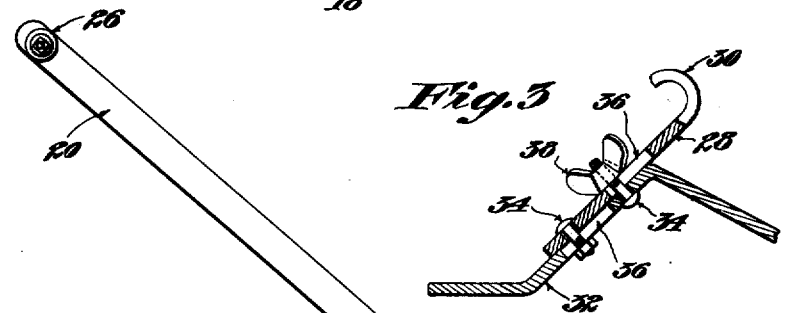
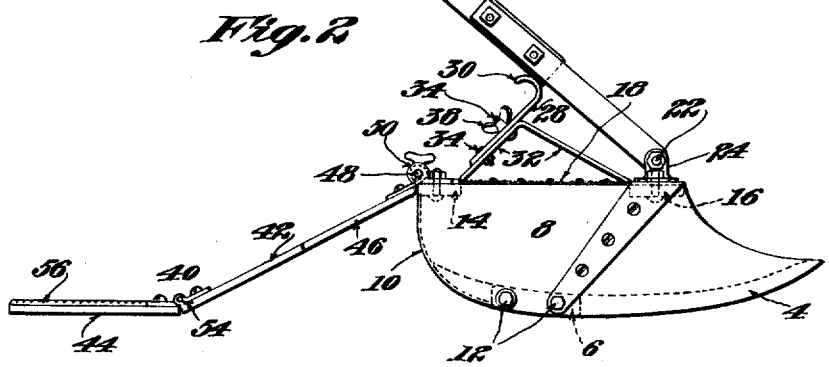

UNITED STATES PATENT OFFICE.

WALDO F. LORING, OF DUXBURY, MASSACHUSETTS, ASSIGNOR OF ONE-HALF TO JOHN B. HADAWAY, OF SWAMPSCOTT, MASSACHUSETTS.

DEVICE FOR HARVESTING CRANBERRIES.

1,348,132.   Specification of Letters Patent.   Patented July 27, 1920.

Application filed February 12, 1919. Serial No. 276,507.

*To all whom it may concern:*

Be it known that I, WALDO F. LORING, a citizen of the United States, residing at Duxbury, in the county of Plymouth and State of Massachusetts, have invented certain new and useful Improvements in Devices for Harvesting Cranberries; and I do hereby declare the following to be a full, clear, and exact description of the invention, such as will enable others skilled in the art to which it appertains to make and use the same.

This invention relates to devices for harvesting cranberries. It has been customary to gather cranberries by means of a scoop having a bottom formed like a comb, the forwardly extending teeth of which are suitably spaced apart to permit the passage between them of the vines but not of the berries which are retained in the scoop. In using what is now considered the best form of cranberry scoop the operator, grasping it at the top with both hands, thrusts it forwardly close to the ground, so that its teeth pass through the vines beneath the berries, and then tilts it backwardly, causing the teeth to strip the berries from the vines. While this has been heretofore the most satisfactory mode of harvesting cranberries, so far as the inventor is aware, its practice compels the operator of the scoop to lean over constantly and the work is consequently very laborious. The object of the present invention is to improve the construction and mode of operation of cranberry harvesting devices of this general character in order to facilitate their operation and to expedite the harvesting of the berries.

With this object in view, one feature of the invention contemplates the production of a practical cranberry harvesting device having a scoop which is adapted to be pushed ahead of the operator and manipulated by him, without the necessity of stooping or bending over, so as to effectively strip the berries from the vines. In the preferred construction for securing this result, the scoop is convexly curved at the bottom so that it may be rocked forwardly and rearwardly and is provided with a handle which is pivotally connected to the upper part of the scoop, forward of its center of gravity, in such a manner that when the handle is pushed from the rear of the scoop the latter is first rocked so as to tilt the ends of the teeth downwardly into position to penetrate the vines below the berries and then the scoop is advanced through the vines. Thereafter when the handle is pulled backwardly the arrangement is such that the scoop is rocked backwardly to raise the teeth and strip the berries from the vines. The scoop is also provided with an adjustable abutment which coöperates with the handle, to limit the forward rocking movement of the scoop, thereby determining the elevation of the teeth from the ground for each forward movement of the scoop.

The invention further consists in other novel features of construction, combination and arrangement of parts hereinafter described and claimed, the advantages of which will be apparent to those skilled in the art from the following description.

The preferred embodiment of the invention is illustrated by the accompanying drawings, in which:

Figure 1 is a top plan view of the device; Fig. 2 is a view in side elevation thereof; and Fig. 3 is a detail sectional view on an enlarged scale of the adjustable abutment which coöperates with the handle.

As shown in the drawings the scoop is formed with a bottom comprising a comb having a series of forwardly extending pointed fingers or teeth 4 which are suitably separated by means of spacing blocks 6 to permit the vines to be readily drawn through the spaces between the teeth while preventing the escape therethrough of the berries. Two side pieces 8 and a curved wall 10 constitute respectively the sides and rear of the scoop. The teeth and the spacing blocks are held in place between the side pieces by means of a pair of tie rods 12 which extend through the several parts binding them all together. The side pieces 8 are also connected at the rear and front portions of their upper edges by cross-pieces 14 and 16 respectively. The opening at the top of the scoop between the cross-pieces 14 and 16 is covered by a strip 18 of wire mesh. The under sides of the teeth 4 and the bottom edges of the side pieces are severally formed with the same convex contour so that the scoop may be rocked to alternately raise and lower the forward ends of the teeth without lifting the scoop bodily from the ground.

The handle, by means of which the device is operated, is indicated at 20. In order that the scoop may be rocked forwardly, before it is advanced, so that the ends of the teeth will be positioned below the berries, and in order that it may be rocked backwardly, after it has been pushed into the vines so that the required stripping movement will be imparted to the teeth, the handle 20, which is forked at its lower end, is pivotally connected to the scoop above and forward of the center of gravity of the latter by means of a transverse rod 22 which extends through the forked end of the handle and is supported by a pair of brackets 24 on the cross-piece 16. The handle is formed at its upper end with a suitable cross-bar 26 which is adapted to be gripped by both hands of the operator.

The abutment which serves to limit the forward rocking movement of the scoop is indicated at 28 and consists of a plate which is bent at 30 so as to adapt it for engagement with the handle and is adjustably but rigidly mounted on a support 32 which is secured to the middle part of the cross-pieces 14 and 16. The means for adjustably mounting the abutment 28 on its support 32 comprises two bolts 34, each of which extends through an aperture in one of said parts and through an elongated slot 36 in the other of said parts, and one of which is provided with a winged clamping nut 38 for securing the abutment in adjusted position. By loosening the nut 38 the abutment may be adjusted toward and away from the handle to vary the amount of forward rocking movement which is to be imparted to the scoop. In this way the teeth may be positioned at the elevation which is best suited to the condition of the vines and the operator is enabled to secure the most effective harvesting of the berries. By limiting the forward rocking movement of the scoop the abutment prevents the teeth from digging into the ground and thereby uprooting the vines and interfering with the advance of the scoop. It will be apparent that the extent of the rocking movement of the scoop is determined not only by the adjustment of the abutment but also by the angle at which the handle is held by the operator in pushing the scoop. It is intended that when the operator is standing erect and holding the handle in a natural position that the handle will then be raised sufficiently above the abutment so that when the operator pushes on the handle to advance the scoop, the resulting upward movement of the abutment will be sufficient to permit the scoop to rock the required amount. Accordingly it will be necessary, in adjusting the abutment, to take into consideration the height of the operator. It will also be apparent that, while the abutment serves to determine the elevation of the teeth from the ground when the handle is held in a natural position as it is being pushed, the operator may nevertheless vary the elevation at will by holding the handle higher or lower than normal, or he may at any time lift the teeth quickly to avoid an obstruction.

After the required quantity of berries have been gathered in the scoop, it is desirable to tilt the scoop backwardly into a substantially upright position and to raise it somewhat from the ground to free it from exceptionally long vines or preparatory to transferring the berries to a suitable receptacle. In order that this may be readily accomplished by the operator without the necessity of stooping or bending over, means is provided which is adapted to be engaged by the operator's foot to hold the scoop against backward sliding movement, so that the operator may tilt it into the required position and then lift it from the ground merely by pulling the handle upwardly toward himself. This means consists of a trailer 40 which is pivotally connected with the rear of the scoop and is adapted to drag along the ground on one side of the operator and to be held firmly against the ground by the foot of the operator when it is desired to tilt the scoop into an upright position. For this purpose the trailer is constructed in two sections comprising an arm 42 and a foot-piece 44. The arm 42 is provided at one end with a laterally offset yoke portion 46 which is pivoted on a transverse rod 48 that is supported at its ends by means of brackets 50 on the cross-piece 14 of the scoop, and the opposite end of the arm 42 normally rests upon the ground. The arm 42 is prevented from moving laterally on the rod 48 by means of a pair of collars 52 which are provided with thumb screws by which they are held in place on the rod 48 adjacent the inner edges of the opposite sides of the yoke portion 46. The foot-piece 44 is hinged to the arm 42 at 54, so that it is adapted to lie flat on the ground, and it is provided on its upper face with a friction pad 56, in order that it may be securely held when stepped upon by the operator. When it is desired to tilt the scoop into an upright position, the operator steps upon the foot-piece 44, and at the same time pulls the handle 20 upwardly toward himself, thus causing the scoop to be first rocked backwardly upon its rear curved wall 10 until the arm 42 of the trailer lies flat upon the ground, whereupon the scoop is then swung rearwardly about the rod 48 as a fixed pivot until it is brought into a substantially upright position. Continued upward pulling of the handle will lift the scoop from the ground, swinging the arm 42 upwardly about the hinge 54, until the scoop may be easily grasped by the operator without bending over. The trailer may then be conveniently used as a handle to aid in lifting the scoop and emptying the berries therefrom. In practice it may be found more desirable to have the foot piece of the trailer located centrally with respect to the rear of the scoop, as indicated by broken lines in Fig. 1, and by loosening the thumb screws in the collars 52 it may be shifted readily into such position or into any intermediate position which may be found desirable and retained in its adjusted position by the collars.

In using the present device, the operator grasps the handle with both hands, lifting it from the abutment 28 and pushing forwardly thereon. Inasmuch as this force is applied to the scoop at a point above and forward of its center of gravity, the scoop will be rocked forwardly, tilting about its pivotal connection with the handle and causing the forward ends of the teeth to be swung downwardly and the abutment 28 to be swung upwardly until the latter strikes against the under side of the handle. The abutment thus serves as a gage for determining the elevation of the teeth before the scoop starts to advance. The rocking movement of the scoop being arrested by the engagement of the abutment with the handle, the frictional resistance between the curved bottom of the scoop and the ground is overcome and the scoop is advanced with the forward ends of the teeth passing through the vines at the elevation which was determined by the engagement of the abutment with the handle. This elevation should be such that the teeth are projected beneath the lowest of the berries on the vines. After the scoop has been advanced until the teeth extend a sufficient distance into the vines the operator pulls the handle upwardly toward himself. The weight of the scoop and contents and the frictional resistance of the vines will prevent backward sliding movement of the scoop and the scoop will therefore be rocked backwardly and the forward ends of the teeth will be raised through the vines so as to strip off the berries. The foot-piece 44 of the trailer, which normally rests upon the vines is not adapted to be readily moved backward since it is liable to catch in the vines and consequently it assists materially in preventing backward sliding movement of the scoop when the handle is pulled to effect the stripping of the berries from the vines. The handle is then pushed forward again and the cycle of operations wherein the teeth are successively lowered, advanced and raised is repeated until the scoop is ready to be emptied. The operator, by pulling the handle closer to himself, may at any time increase the backward rocking movement of the scoop so as to free the teeth from any vines which may have become entangled therewith. When the scoop is ready to be emptied it may be tilted backwardly into an upright position and lifted from the ground in the manner hereinbefore described, and the berries transferred to a receptacle which is provided to receive them. It will be observed that while the operator is not obliged to stoop or bend over he may nevertheless operate the scoop to harvest the berries in practically the same manner in which the ordinary cranberry scoop is manipulated.

The practical use of the above described device has greatly reduced the amount of labor heretofore required for harvesting berries. Moreover the device has been proved capable of being operated much more rapidly than devices which require the constant bending over or stooping of the operator.

While it is preferred to employ the specific construction and arrangement of parts herein shown and described, it will be understood that this construction is not essential except so far as specified in the claims and may be modified without departing from the broader features of the invention.

The invention having been described, what is claimed is:—

1. A hand operated device for harvesting cranberries or the like having, in combination, a comb for stripping the berries from the vines, means for retaining the berries, a handle extending rearwardly from the device, and connections between the handle and retaining means designed to depress and advance the comb when the handle is pushed forwardly in the direction of its length and to elevate the comb when the handle is pulled in a reverse direction.

2. A hand operated device for harvesting cranberries or the like having, in combination, a scoop provided with a comb upon its front edge adapted to strip the berries from the vines and having its bottom portion shaped to permit rocking movements to elevate and depress the comb, a handle extending rearwardly from the scoop, and scoop connections between the handle and scoop designed to depress and advance the comb when the handle is pushed forwardly in the direction of its length and to elevate the comb when the handle is pulled backwardly in the direction of its length.

3. A hand operated device for harvesting cranberries or the like having, in combination, a toothed scoop for stripping the berries from the vines having a bottom convexly curved to permit the scoop to be rocked forwardly, a handle for the scoop extending rearwardly, and a movable connection between the scoop and handle constructed and arranged to cause the scoop to be first dropped forwardly so that its teeth will be positioned to penetrate the vines below the berries and then advanced when the handle is pushed forwardly in the direction of its length, and to cause the scoop to be rocked backwardly to strip the berries from the vines when the handle is pulled backwardly in the direction of its length.

4. A hand operated device for harvesting cranberries or the like having, in combination, a toothed scoop for stripping the berries from the vines, a handle for the scoop extending rearwardly therefrom, a pivotal connection between the scoop and handle adapted to provide rocking movements of the handle with respect to the scoop and designed to depress and advance the teeth of the scoop when the handle is pushed forwardly in the direction of its length and to elevate the teeth of the scoop when the handle is pulled backwardly in the direction of its length, and means for limiting the forward tilting movement of the scoop to depress the teeth.

5. A hand operated device for harvesting cranberries or the like having, in combination, a toothed scoop for stripping the berries from the vines having a bottom convexly curved to permit the scoop to be rocked forwardly, a handle for the scoop extending rearwardly therefrom, a pivotal connection between the scoop and the handle located to cause the scoop to be first rocked forwardly so that its teeth will be positioned to penetrate the vines below the berries, and then advanced, when the handle is pushed forwardly, and to cause the scoop to be rocked backwardly to strip the berries from the vines, when the handle is pulled backwardly, and an abutment on the scoop movable with respect to the handle and arranged to engage the handle to limit the forward rocking movement of the scoop.

6. A hand operated device for harvesting cranberries or the like having, in combination, a toothed scoop for stripping the berries from the vines having a bottom convexly curved to permit the scoop to be rocked forwardly, a handle pivotally connected with the scoop and extending rearwardly therefrom, for causing the scoop to be first rocked forwardly so that its teeth will be positioned to penetrate the vines below the berries, and then advanced, when the handle is pushed forwardly, and for causing the scoop to be rocked backwardly to strip the berries from the vines, when the handle is pulled backwardly, and an adjustable abutment adapted to contact with the handle when pushed forwardly and serving as a gage to determine the elevation of the teeth from the ground when the scoop is in its forwardly tilted position.

7. A device for harvesting cranberries or the like having, in combination, a scoop having a bottom formed with a plurality of teeth adapted to strip the berries from the vines, a handle pivotally connected with the scoop and extending rearwardly therefrom for rocking the scoop forwardly and advancing it when the handle is pushed in the direction of its length and for rocking the scoop backwardly when the handle is pulled in the direction of its length, and means for holding the scoop when the handle is pulled rearwardly to permit the scoop to be tilted backwardly into substantially upright position by the rearward pulling movement of the handle.

8. A device for harvesting cranberries or the like having, in combination, a scoop having a bottom formed of a plurality of teeth adapted to strip the berries from the vines, a handle pivotally connected with the scoop and extending rearwardly therefrom for rocking the scoop forwardly and for advancing it, when the handle is pushed, and for rocking the scoop backwardly, when the handle is pulled toward the operator, and a trailer pivotally connected with the rear of the scoop and arranged to drag on the ground within reach of the operator so that it may be held against the ground by the operator's foot for the purpose of preventing the scoop from sliding backward when the handle is pulled to tilt it into upright position.

9. A device for harvesting cranberries or the like having, in combination, a scoop having a bottom formed of a plurality of teeth adapted to strip the berries from the vines, a handle pivotally connected with the scoop and extending rearwardly therefrom for rocking the scoop forwardly and for advancing it, when the handle is pushed, and for rocking the scoop backwardly, when the handle is pulled toward the operator, and a trailer comprising an arm pivotally connected with the rear of the scoop above the ground and a foot piece hinged to said arm and arranged to drag on the ground within reach of the operator, so that when the footpiece is held against the ground by the operator's foot and the handle pulled upwardly the scoop will be tilted backwardly and raised from the ground.

10. A device for harvesting cranberries or the like having, in combination, a scoop having a bottom formed of a plurality of teeth adapted to strip the berries from the vines, a handle pivotally connected with the scoop and extending rearwardly therefrom for rocking the scoop forwardly and advancing it, when the handle is pushed, and for rocking the scoop backwardly, when the handle is pulled toward the operator, and a trailer comprising an arm pivotally connected and laterally adjustable at the rear of the scoop arranged to drag on the ground within reach of the operator, so that when the footpiece is held against the ground by the operator's foot and the handle pulled upwardly the scoop will be tilted backwardly and raised from the ground.

WALDO F. LORING.